Dec. 12, 1939.  G. L. KERENTOFF  2,183,292
DAMPER MOUNTING AND REGULATING MEANS
Filed Oct. 11, 1938  2 Sheets-Sheet 1

INVENTOR.
GOTTLIEB L. KERENTOFF
BY Joseph A. Rave
ATTORNEY.

Dec. 12, 1939.   G. L. KERENTOFF   2,183,292
DAMPER MOUNTING AND REGULATING MEANS
Filed Oct. 11, 1938   2 Sheets-Sheet 2

INVENTOR.
GOTTLIEB L. KERENTOFF
BY Joseph A. Rave
ATTORNEYS.

Patented Dec. 12, 1939

2,183,292

UNITED STATES PATENT OFFICE 2,183,292

DAMPER MOUNTING AND REGULATING MEANS

Gottlieb L. Kerentoff, Cincinnati, Ohio

Application October 11, 1938, Serial No. 234,493

8 Claims. (Cl. 126—292)

This invention relates to improvements in means for mounting and regulating dampers in ducts, conduits and pipes.

In the past, so-called damper regulators have been employed, which, however, necessitated either the fastening of these regulators to the damper after the damper is placed within the conduit, duct or pipe, or else necessitated the temporary deforming of the duct or pipe in order to place the damper therein. Another disadvantage of the damper in the past was that their mounting necessitated a clearance between the damper and interior of the conduit, duct or pipe, thereby materially cutting down the efficiency of the damper. By the mechanism of the present invention, all of these difficulties are eliminated.

It is therefore an object of this invention to provide a damper regulator which can be readily placed in position for mounting the damper within the duct or pipe.

Another object of this invention is the provision of a damper mounting and regulating means which can be employed without deforming in any manner the duct or pipe, so that the pipe or duct at all times retains its original and desired shape.

Another object of this invention is the provision of a damper mounting and regulating means whereby the damper, when once mounted in position, is definitely prevented from inadvertent disassociation from the pipe or duct and is retained in position until positively removed therefrom.

Another object of this invention is the provision of a damper mounting and regulating mechanism which is readily reversible to place the control at either side thereof, and can be employed with square, rectangular or round pipe, and may be employed as a regulating damper, splitter damper or a volume damper.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings—

Figures 2, 9, 10:
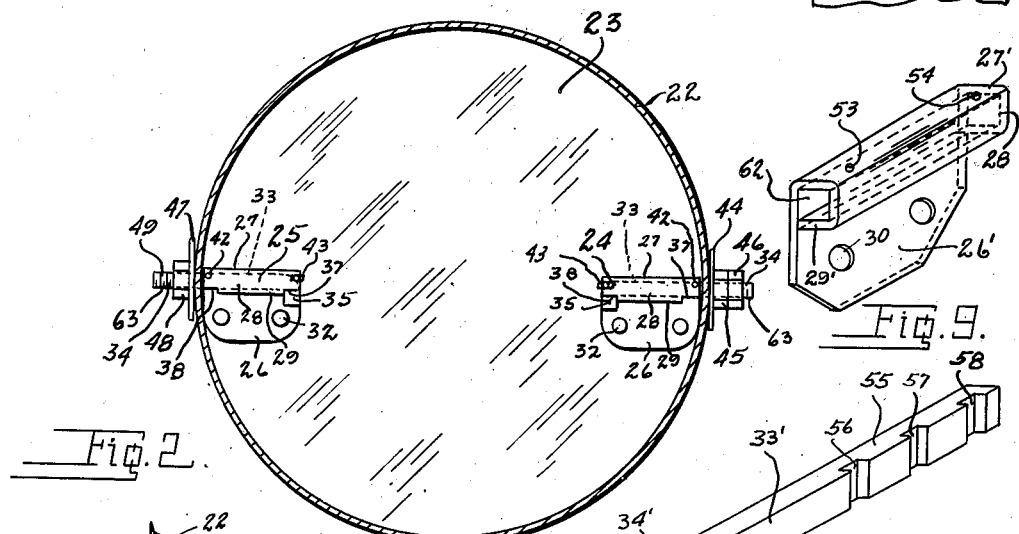
Fig. 2 is a horizontal, sectional view through a circular pipe showing a damper with the mounting and regulating means of this invention in position thereon.
Figure 8:
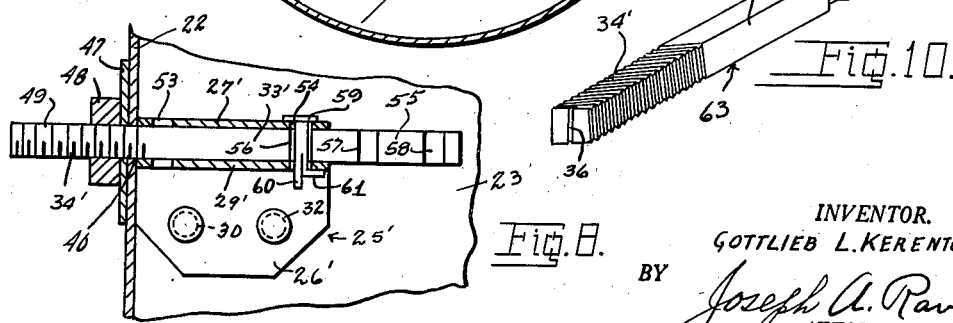
Fig. 8 is an elevational, sectional view, showing a modification in the construction of the damper mounting and regulating means.
Figures 6, 7:
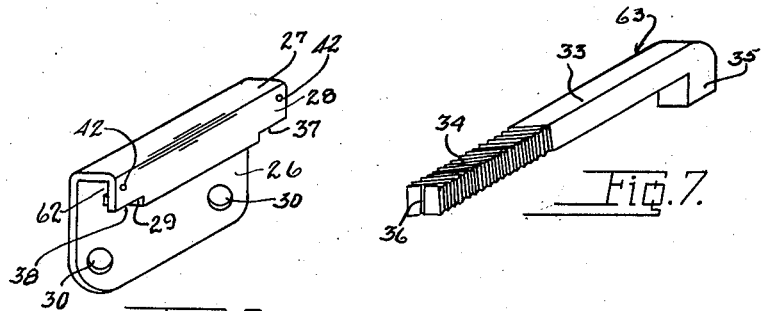
Figs. 6 and 7 are respectively perspective views of the parts of the damper regulator and mounting means illustrated in Figs. 3, 4 and 5.

Figs. 9 and 10, similar to Figs. 6 and 7, are perspective views of the parts of the modified damper mounting and regulating means of Fig. 8.

Figure 1:
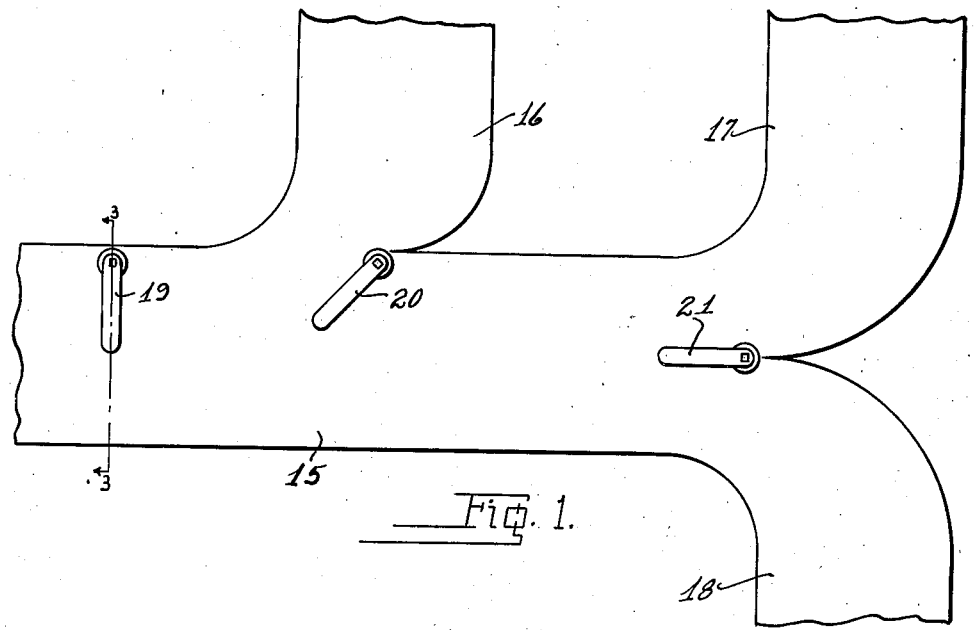
Fig. 1 is a plan view of a conduit or duct system showing the damper control in various positions, and for accomplishing the several functions of a damper.

Referring to Fig. 1, there is illustrated a main duct or conduit 15, through which is passing air, and from which is a side branch 16 and end branches 17 and 18. There is illustrated at 19 a handle for a damper within the main duct 15 which would act as a regulating damper or a volume damper to control the amount of flow through the main duct 15. At 20 and 21 are illustrated similar handles for regulating the position of dampers, which may be referred to as splitter dampers, for splitting the flow in the main conduit 15 into the side branch 16 or unequally splitting the flow from the main conduit 15 into branch conduits 17 and 18. As will later be pointed out, the handles 19, 20 and 21 are attached to the edges of the dampers which they control, but it is to be noted that the connection of the handle 19 to its particular damper may be at the center thereof, and which type of connection is illustrated in Fig. 2.

Referring specifically to Fig. 2, there is illustrated a round or circular pipe or conduit 22 having interiorly thereof the damper 23. Mounted along the center of the circular damper 23, at opposite ends thereof, are the damper attaching mechanisms 24 and 25. The attaching mechanism 25 has a portion extending beyond the pipe, to which the handles 19, 20 and 21 may be attached for operating or regulating the position of the damper 23.

The positioning of dampers in conduits, ducts or pipes, such as has just been described, is common practice, and not invention in this application; however, the means whereby the dampers are mounted and operated is invention in this application, and this structure is commonly referred to as a "damper regulator".

Referring particularly to Figs. 3 to 7 inclusive, the damper regulator, as noted above, comprises in general a damper plate 23 which has secured thereto the damper attaching and regulating mechanisms 24 and 25; since these damper attaching and regulating mechanisms are substantially duplicates of one another, it is deemed sufficient if but one of them be described in detail. Accordingly, and with reference to mechanism 25, use is made of a plate 26, having its upper end bent normal thereto, as at 27, then downwardly parallel with the body of the plate 26, as at 28, then inwardly toward the body of the plate and parallel with the portion 27, as at 29. This results in a structure wherein there is provided an attaching plate 26 having at its upper end a passageway 62 of angular cross section, as seen most clearly in Fig. 4. The plate 26 is provided, near its lower end, with a pair of apertures 30 adapted to register with similar apertures in the damper to receive suitable attaching means, such as rivets 32.

Passing through the angular passage way 62 is a bolt or axle, indicated in general by the reference numeral 63 and illustrated most clearly in Fig. 7, which comprises a body portion 33 having its one end threaded as at 34, and its other end upset to provide a hook as at 35. The end of the body portion 33 is provided with a groove or slot 36 which extends across the body portion 33 in the same direction as the hook 35. The ends of the bottom 29 of the rectangular passage way 62 of the plate 26 are removed, as at 37 and 38, a distance equal to the thickness of the bolt or shaft hook 35, so that the bolt, when in operative position, is completely within the confines of the plate 26, as clearly illustrated in Fig. 3.

Figure 3:
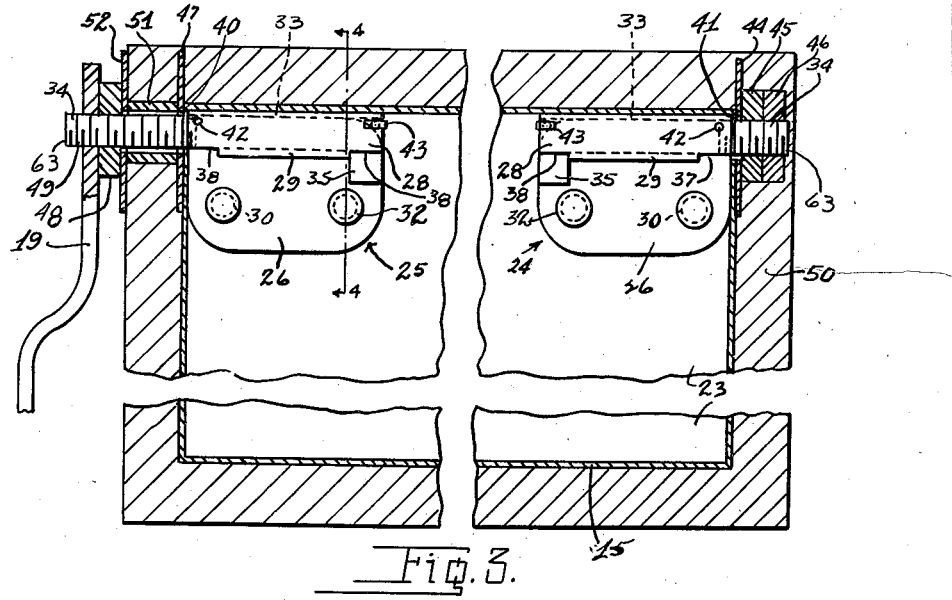
Fig. 3 is an enlarged, fragmentary, transverse, sectional view, taken on line 3—3 of Fig. 1.
Figure 5:
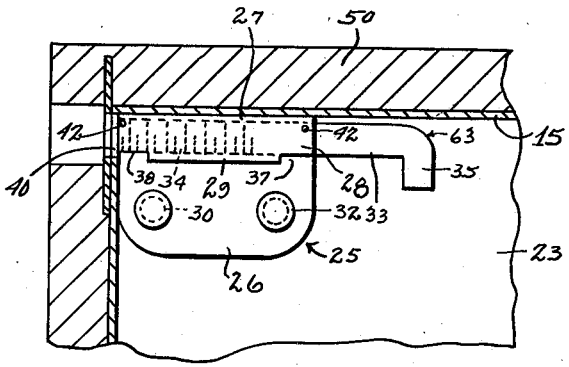
Fig. 5 is a view of a portion of Fig. 3 showing the parts in positions prior to the final mounting of the damper.
Figure 4:
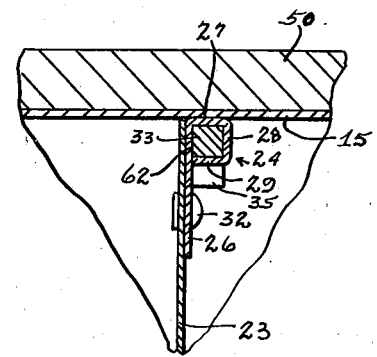
Fig. 4 is a fragmentary, sectional view, taken on line 4—4 of Fig. 3.

In assembling the damper, the plates 26 are attached to the damper 31, as shown in Fig. 3, near one edge thereof, or attached to the damper along its center line, as shown in Fig. 2; whereupon, the bolts or axles 63 have their threaded ends inserted within the passage way 62 of the plates to a position illustrated in Fig. 5. The duct, conduit or pipe, as the case may be, such as duct 15, is punched to provide apertures 40 and 41 which are diametrically opposite one another, and at the points where the damper axles will protrude. The assembled dampers are now inserted within the duct until the axles or bolts 63 align with the apertures 40 and 41; whereupon, they are pushed through the angular passages of the plate 26, so that the threaded ends thereof project beyond the duct 15. It should be noted that the fronts or portion 28 of the angular passage ways 62 are provided at opposite ends thereof with holes 42, so that after the damper is mounted within the duct 40 and the bolts or axles projected through the duct apertures 40 and 41, a cotter key or the like 43 may be placed therein to prevent the said bolts or axles from being pushed out of their passage ways while being worked on on the outside of the duct.

After the damper is in the position just described, and since the bolt or axles 63 has an angular cross section and the aperture in the duct circular so that the axle may turn therein, a washer 44 is mounted on the bolt of the mounted mechanism which is considered the tail or back end of the damper, or the one which does not receive the regulating handle, and indicated above as the mounting mechanism 24. A nut 45 is now screwed on the threaded end 34 of the tail bolt or axle and is screwed down with such force as to frictionally clamp the damper, washer and duct or pipe with sufficient friction to hold the damper in any position of adjustment. A second nut 46 is now threaded on the tail piece bolt to act as a lock nut for the parts and prevent the nut 45 from being inadvertently backed off and relieving the friction on the damper 23. Substantially the same procedure is gone through with at the other or head end of the damper, in that a washer 47 is positioned on the bolt or axle against the pipe and backed up by a nut 48 with a portion, such as 49, of the bolt or axle projecting ahead of the nut 48. The nut 48 acts in combination with the frictional positioning of lock nuts 45 and 46 for securely clamping the damper in any position of adjustment, being backed off or loosened when a change in position is desired or necessary. The handle, such as 19, is provided with an aperture, angular in cross section, corresponding to the angular cross section of the bolt, and is readily inserted on and removable from the projecting head end of the damper axle extension 49. It will be readily appreciated that, if desired, a nut similar to nut 48 may be screwed on the projecting end of the bolt or axle to hold the handle permanently thereon if desired.

The foregoing description is clearly illustrated in Fig. 2, and when it is desired to cover the conduit, duct or pipe with asbestos or other insulating material, the said covering 50 is put on over the lock nuts 45 and 46, as clearly illustrated in Fig. 3, without, however, covering the nut 48 at the head end of the damper. In this connection, the first washer 47 is covered by the insulating material 50, while the extension of the bolt or axle 63 is encircled by a spacer sleeve 51 of a length substantially equal to the thickness of the insulating covering and the insulating covering is disposed around the outside of this spacer sleeve. A second washer 52 is then employed which is located on the outside of the insulating covering 50 and the parts then secured in position by the nut 48, with the handle 19 beyond this nut, as above described. With this construction, the damper can readily be operated or adjusted without interference from or interfering with the asbestos or other insulating covering around the conduit.

From the foregoing, it will now be appreciated that there has been provided a damper mounting and regulating means which will enable a damper to be readily installed, since the body portion of the mounting means is attached to the damper when in a position exteriorly of the duct, conduit or pipe, instead of having to attach this when in position within the pipe as is the case with certain damper regulators here-to-fore employed. It will further be noted that the damper can be inserted within its duct, conduit or pipe, without in any wise deforming the pipe, again as is necessary with some of the here-to-fore known damper regulators, and in which case, the body attaching plates and bolts are formed integral with one another. It will also be noted that with the damper as just described, the tail end of the damper is permanently mounted in position with respect to the damper and the conduit, thereby preventing the inadvertent disassociation of these, as has been the case in the past, and it will further be noted that the damper can be readily locked in any position of adjustment; first by the friction lock nuts 45 and 46, and second by the head end lock nut 48. Furthermore, with the damper mounting and regulating means of this invention, the damper will be made to completely fill the area of the conduit, duct or pipe, since no clearance of any kind around this damper is necessary for any purpose whatsoever, as is the case with prior structures. It should also be noted that the groove 36, in the free end of the bolts or axles, extends in the same direction as the damper, and that this groove or slot at all times indicates the position of the damper, and therefore eliminates the necessity for a dial, although one may be readily employed if desired.

In Figs. 8, 9 and 10 is illustrated a slight modification of the parts of the damper mounting and control mechanism, in that the plate passageway 62 is not provided with the bottom cut outs 37 and 38, and is further devoid of having holes 42 in the front 28 of the plate passageway. Instead, the plate 26', illustrated in Fig. 9, has its bottom 29' the same length as its top 27' and front 28', and is further provided in its top and bottom with aligned perforations 53 and 54. The bolt or axle 63', used with the plate 26', has a body portion 33' and a threaded portion 34', similar to the body portion and threaded portion of Fig. 7. Instead, however, of having the upset or hooked end 35 of Fig. 7, the body portion 33' of Fig. 10 is extended, as at 55, and is provided, in one face thereof, with notches 56, 57 and 58. These notches, like the hooked end 35, extend in the same direction as a slot 36' in the end of the bolt or axle 63'. It should be noted that the cross section of the bolt or axle of Fig. 10 is substantially equal to the passageway of the mounting plate 26'. The plate 26' is attached to the damper in the same way that the plate 26 is attached and above described, and the damper, with these plates thereon, is mounted within the pipe, conduit or duct with the passageways in line with preformed apertures in the pipe, duct or conduit, whereupon the bolts or axles of Fig. 10 are inserted from the outside through these aligned apertures and passageways, although it may be inserted from the inside, as above described. Depending upon whether or not the pipe, duct or conduit is to be left uncovered or covered, the bolt or axle 63', at the head end of the damper, will be more or less inserted within its passageway. In other words, if the pipe is to remain uncovered, the bolt is to be inserted to the position shown in Fig. 8, namely with the innermost notch 56 in line with the aperture 53 or 54, farthest removed from the pipe, duct or conduit, whereupon a fastening means, such as a cotter key 59, is inserted through the said perforations 53 or 54 and the aligned notch 56, and the legs 60 and 61 of said cotter key spread to retain the same in position. If, however, the pipe is to be insulated or covered, say to a half inch, as illustrated in Fig. 3, the bolt or axle of Fig. 10 would be positioned to have its center notch 57 aligned with the desired aperture 53 or 54, while, if an extra heavy covering of insulating material is to be used, the notch 58 would be employed for this purpose. Otherwise, the mounting of the damper would be identical with that above described in connection with Figs. 3 to 7 inclusive.

In connection with the modified structure of Figs. 8 to 10, it will be readily appreciated that the notch 56, 57 or 58 and element 59 co-operate with one another for limiting the axial movement of the axle when the nuts 45, 46 and 48 are screwed thereon, the same as the upset or hook portion 35 of the bolt or axle first described.

What is claimed is:

1. In a device of the class described, the combination of a mounting plate having a passageway, an axle clamping bolt separable from the mounting plate and axially shiftable through the passageway, said axle clamping bolt having one end threaded for lock and clamping nuts and the other end vertically slotted, said mounting plate passageway walls having apertures therethrough adapted to be aligned with the axle clamping bolt slot, and means extending through the aligned axle clamping bolt slot and passageway walls apertures for securing the bolt against axial movement.

2. In a device of the class described, the combination of a mounting plate having a passageway, an axle clamping bolt separable from the mounting plate and axially shiftable through the passageway, said axle clamping bolt having one end threaded and having formed in one side thereof a slot located between the threads and its other end, said mounting plate passageway walls having formed therein axially aligned apertures adapted to be aligned with the axle clamping bolt slot, and removable means extending through the aligned passageway walls apertures and axle clamping bolt slot for securing the axle clamping bolt against axial movement in the passageway.

3. In a device of the class described, the combination of a mounting plate having a passageway, an axle clamping bolt separable from the mounting plate and axially shiftable through the passageway, said axle clamping bolt having one end threaded and having formed in one side thereof a plurality of spaced slots located between the threads and its other end, said mounting plate passageway walls having formed therein axially aligned apertures adapted to be aligned with any one of the side slots of the axle clamping bolt to more or less project the threaded end thereof beyond the mounting plate, and removable means extending through the aligned passageway walls apertures and axle clamping bolt slots for securing the axle clamping bolt against axial movement in the passageway.

4. In a damper regulator of the class described, for use with a damper within a duct, the combination of a mounting plate at one end of the damper and having a passageway, an axle clamping bolt separable from the mounting plate and axially shiftable through the passage through and beyond the duct, said axle clamping bolt having the end projecting beyond the duct threaded and having formed in one side thereof a plurality of spaced slots located between the threads and its other end, said mounting plate passageway walls having formed therein axially aligned apertures adapted to be aligned with any one of the side slots of the axle clamping bolt to more or less project the threaded end thereof beyond the mounting plate and duct, removable means extending through the aligned passageway walls apertures and axle clamping bolt slot for securing the axle clamping bolt against axial movement in the passageway, and a clamping nut on said projecting threaded end of the clamping bolt for securing the parts to one another.

5. In a damper regulator of the class described, for use with a damper within a duct, the combination of a mounting plate at one end of the damper and having a passage way, an axle clamping bolt separable from the mounting plate and axially shiftable through the passage through and beyond the duct, said axle clamping bolt having the end projecting beyond the duct threaded and having formed in one side thereof a plurality of spaced slots located between the threads and its other end, said mounting plate passage way walls having formed therein axially aligned apertures adapted to be aligned with any one of the side slots of the axle clamping bolt to more or less project the threaded end thereof beyond the mounting plate and duct, removable means extending through the aligned passage way walls apertures and axle clamping bolt slot for securing the axle clamping bolt against axial movement in the passage way, a clamping nut on said projecting threaded end of the axle clamping bolt for securing the parts to one another, a removable sleeve around the projecting axle clamping bolt between the clamping nut and the duct, an axle clamping bolt at the other end of the damper plate and projecting beyond the duct, said last named axle bolt projection being threaded, and clamping and lock nuts on said last mentioned axle clamping bolt.

6. In a damper mounting and regulator means, the combination with a conduit having a damper therein, of a mounting plate secured to one side of the damper and having a passage therethrough, a separable axle clamping bolt insertable from within the conduit through the mounting plate passage and through and beyond the conduit, co-operating abutments respectively carried by the mounting plate and axle clamping bolt to limit the movement of said axle clamping bolt, said projecting end of the axle clamping bolt beyond the conduit being threaded, and a clamping nut on said threaded end of the axle clamping bolt for securing the damper in adjusted position.

7. In a damper mounting and regulator means, the combination with a conduit having a damper therein, of a mounting plate secured to one side of the damper and having a passage therethrough, a separable axle clamping bolt insertable from within the conduit through the mounting plate passage and through and beyond the conduit, co-operating abutments respectively carried by the mounting plate and axle clamping bolt to limit the movement of said axle clamping bolt, said projecting end of the axle clamping bolt beyond the conduit being threaded, a clamping nut on said threaded end of the axle clamping bolt for securing the damper in adjusted position, and a removable sleeve around the projecting axle clamping bolt between the nut and conduit.

8. In a damper mounting and regulator means, the combination with a conduit having a damper therein, of a mounting plate secured to one side of the damper and having a passage therethrough, a separable axle clamping bolt insertable from within the conduit through the mounting plate passage and through and beyond the conduit, co-operating abutments respectively carried by the mounting plate and axle clamping bolt to limit the movement of said axle clamping bolt, said projecting end of the axle clamping bolt beyond the conduit being threaded, a clamping nut on said threaded end of the axle clamping bolt for securing the damper in adjusted position, a removable sleeve around the projecting axle clamping bolt between the nut and conduit, a second mounting plate secured to the other side of the damper and having a passage therethrough, a separable axle clamping bolt insertable through the mounting plate passage and through and beyond the conduit, co-operating abutments respectively carried by the mounting plate and axle clamping bolt to limit the movement of said axle clamping bolt, said projecting end of the axle clamping bolt beyond the conduit being threaded, and clamping and lock nuts on said threaded end of the last mentioned axle clamping bolt.

GOTTLIEB L. KERENTOFF.